000,047

United States Statutory Invention Registration [19]

[11] Reg. Number: H47

[45] Published: Apr. 1, 1986

Monib

[54] PANEL WITH ARAMID HONEYCOMB CORE

[75] Inventor: Mohamed M. Monib, Newark, Del.

[73] Assignee: E. I. Du Pont de Nemours and Company, Wilmington, Del.

[21] Appl. No.: 734,192

[22] Filed: May 15, 1985

[51] Int. Cl.[4] ..... B32B 3/12

[52] U.S. Cl. ..... 428/116; 52/806; 156/292; 428/395

*Primary Examiner*—John F. Terapane
*Assistant Examiner*—Howard J. Locker

[57] ABSTRACT

A lightweight structural panel having an aramid honeycomb core faced with a resin-impregnated fiber layer is provided with increased peel strength between the core surface and facing layer by interposing a spunlaced fabric containing at least 50 weight percent aramid fibers and being pervaded with the resin between the core and the facing. Phenolic resins and woven facing fabrics of poly(p-phenylene terephthalamide) yarns are preferred.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PANEL WITH ARAMID HONEYCOMB CORE

BACKGROUND OF THE INVENTION

1. Field of the Invention

This invention relates to a lightweight structural panel having a honeycomb aramid core which is faced with a resin-impregnated fiber layer. More particularly, the invention concerns such a panel having significantly increased peel strength between the facing layer and the core and a process for making the improved panel.

2. Description of the Prior Art

A lightweight structural panel, having an aramid honeycomb core faced with a resin-impregnated fiber layer is known. Such panels have been used in aircraft for lightweight structural members, such as floorings, window panels, overhead luggage storage bins, and the like. Panels having high strength and stiffness have been made with facing layers in the form of resin-impregnated woven fabrics or cross-laid, unidirectional tapes made from high-strength, high-stiffness yarns of poly(p-phenylene terephthalamide), fiberglass, or carbon. For aircraft-interior applications, a phenolic resin is usually used for the facing impregnant because of its low emission of smoke and toxic gases under fire conditions.

In manufacture of the above-described panels, the facing layer is adhered to the aramid honeycomb core by activation and curing of the resin. Only a small fraction of the honeycomb cross-section consists of solid material. The solid material is only in the walls which form the cells of the honeycomb. Thus, there is very little area on the surface of the honeycomb core to which the impregnated-fiber facing layer adheres. Because of the small area available for adhesion, the peel strength between the facing layer and the aramid honeycomb core of the above-described panels often is less than desired. Accordingly, an object of the present invention is to provide such a panel with increased peel strength between the core and the facing.

SUMMARY OF THE INVENTION

The invention provides an improved lightweight structural panel having an aramid honeycomb core faced with a resin-impregnated fiber layer. The improvement comprises, for increased peel strength between the core and facing layer, a spunlaced fabric composed of at least 50% by weight of aramid fibers, said fabric being pervaded with the resin, being located between the facing layer and the core and providing a strong bond between the core and facing. Preferably, the aramid fibers of the spunlaced fabric are of poly(m-phenylene isophthalamide). Preferred spunlaced fabric has a unit weight in the range of 15 to 30 g/m$^2$. Phenolic resins are preferred. Preferred facing layers are resin-impregnated woven fabrics of poly(p-phenylene terephthalamide) yarns.

The invention also includes a process for making the improved panel. The process comprises forming an assembly of an aramid honeycomb core, a spunlaced fabric which includes at least 50% by weight of aramid fibers, and a resin-impregnated fiber facing layer, by interposing the spunlaced fabric between and adjacent to the surface of the honeycomb and a surface of the facing layer, heating the assembly to cause resin from the facing to pervade the interposed spunlaced fabric and curing the resin to bond the assembly.

DETAILED DESCRIPTION OF PREFERRED EMBODIMENTS

As used herein, PPD-T refers to poly(p-phenylene terephthalamide) polymer and MPD-I refers to poly(m-phenylene isophthalamide) polymer.

In accordance with the present invention, the lightweight structural panels include, as important components an aramid honeycomb core, a resin-impregnated facing layer, and a spunlaced nonwoven fabric. The spunlaced fabric, which is pervaded by the resin is located between a surface of the honeycomb and the facing layer. In a preferred panel, a sandwich structure is used. In the sandwich panel, the upper and lower surfaces of the aramid core are each bonded to a corresponding resin-impregnated facing layer with a spunlaced fabric interposed between each facing and the core.

Aramid honeycomb cores of the type suitable for use in the panels of the invention are known in the art. Preferably, the core is made of MPD-I paper. Such aramid honeycomb cores are available commercially from Hexcel Corporation, Dublin, Calif. (e.g., HRH-10 aramid fiber reinforced honeycomb having an average cell size of about 3,2 mm [1/8 inch] and a nominal density of about 0.05 g/cm$^3$ [3.0 lbs./ft.$^3$]. Of course, the size of the cells, the density, the overall dimension and the strength and stiffness characteristics of the core can vary considerably, depending on the intended use of the panel.

The resin-impregnated fiber layer which forms the facing of the panels of the invention are made of woven fabrics or of cross-laid unidirectional tapes, of high-strength, high-stiffness yarns. Yarns of PPD-T polymer are preferred. Many resins are suitable for use in the invention but phenolic resins are preferred. Curable phenol formaldehyde resins are particularly preferred. The amount of resin employed in the facing may vary widely. Add-ons of 50 to 200% based on the dry weight of the facing yarns generally are suitable. Add-ons of 70 to 130% are preferred. The total weight of the facing fabric also may vary considerably depending on the intended use of the panel. For example, resin-impregnated facings having a unit weight in the range of 70 to 500 g/m$^2$ (2-15 oz/yd$^2$) are generally useful, with unit weights of 200 to 400 g/m$^2$ being preferred.

The fabric that is interposed between the facing and the surface of the aramid core of the lightweight structural panel of the invention, is made by the general methods disclosed by Bunting et al., U.S. Pat. No. 3,508,308. The fabric is a spunlaced nonwoven fabric composed of at least 50% by weight staple aramid fibers or blends of such fibers with other staple fibers such as polyester fibers. The preferred aramid fibers are of MPD-I polymer. In the process of making the spunlaced fabric, the staple fibers are formed into carded and cross-lapped batts which are then fed to a staple-fiber, air-lay, web-forming machine which forms a lightweight, uniform, random batt. Batt weights of 25 to 60 g/m$^2$ are generally useful, though somewhat heavier or lighter batts may also be used. Preferred batt weights are in the range of 30 to 45 g/m$^2$. The thusly formed batt is then passed through a series of high impact, small-diameter columnar jets of water which entangle the staple fibers into a strong, stable, spunlaced fabric. Nonapertured spunlaced fabrics are preferred.

In a preferred embodiment of the invention, the spunlace fabric is stretched transversely by about 60% to reduce its unit weight, preferably to a weight in the range of 15 to 25 g/m². The fabric is then calendered. For preferred webs of at least 50% MPD-I fibers, the calendering typically is performed under high pressure and at temperatures of about 240 to 250° C. The calendering makes the web thinner, but does not impair its ability to act as a carrier for the resin of the facing in the final assembly. It has been found that the thinner the stretched and calendered spunlaced fabric, the stronger the bond that is generally obtained between the facing and the honeycomb core of the final panel.

The process of the invention involves forming an assembly of the above-described components, heating and curing the resin to fully bond the assembly. In the assembly the spunlaced fabric is positioned between the resin-impregnated facing layer and the surface of the honeycomb core to which the facing is to be attached. The components are held firmly together and then heated to activate the resin. As a result of the heating, the resin pervades the spunlaced fabric. Further heating cures the resin and forms a strong bond among the components. The heating and curing may be performed in an autoclave or in a vacuum bagging operation.

EXAMPLE

This example illustrates the invention with the fabrication of a strong, lightweight sandwich panel. The example also demonstrates the large advantage in peel strength that is obtained with panels of the invention over panels made by a prior-art method in which no spunlaced fabric is included in the structure.

Continuous filament yarns of 1267 dtex (1140-denier) of poly(p-phenylene terephthalamide) polymer (Kevlar® 49 aramid yarn sold by E. I. du Pont de Nemours and Company, Wilmington, Del.) were woven into a crowfoot weave fabric (Kevlar® Style 285 fabric) having an end count of 6.7×6.7 per cm (17×17 per inch) and a unit weight of 173 g/m² (5.1 oz/yd²). The fabric was impregnated with a curable phenol formaldehyde resol ("WeyRez-X 5000" phenolic resin, a product of Weyerhaeuser Co., Tacoma, Wash.) in the form of a solution containing 50% by weight solids. Two layers of the impregnated fabric were placed upon a plastic film atop a flat metallic plate. The impregnated fabric was air dried to drive out the solvent. A dry basis add-on of 100% was achieved. The impregnated fabrics were placed one atop the other and then placed thereupon was a layer of spunlaced fabric of a blend of 60 wt. % of 1.7 dtex (1.5-denier), 1.9-cm (0.75-inch) long staple fibers of poly(m-phenylene isophthalamide) (Type-450 Nomex® aramid fiber sold by E. I. du Pont de Nemours and Company) and 40 wt % 1.5 dtex (1.35-denier), 1.9-cm (0.75-inch) long staple fibers of poly-(ethylene terephthalate) (Type-106 Dacron® polyester fiber sold by E. I. du Pont de Nemours and Company). The spunlaced fabric had been stretched 60% in the cross machine direction to provide a unit weight of 20 g/m² (0.6 oz/yd²) and then calendered at 245° C. under a load of 400 kg per linear centimeter. Upon the layer of spunlaced fabric was next placed a layer of poly(m-phenylene isophthalamide) honeycomb measuring 35.6 cm (14 inches) on each side and 1.27 cm (0.5 inch) in thickness. The honeycomb core was a product of Hexcel Corporation, Dublin, Calif. Another sheet of the spunlaced fabric was placed on top of the honeycomb and two more layers of the resin-impregnated fabrics were placed atop the spunlaced fabric. The thusly prepared assembly was vacuum bagged and cured at a temperature of 126° C. and a pressure of 310kPa (45 psi).

The cured product was a sandwich panel (designated below as "Test Panel") comprising a laminate of an aramid honeycomb core having upper and lower facing layers, with spunlaced fabric interposed between the core and the facing layers. The test panel was cut into strips measuring 7.6-cm wide by 30.5-cm long (3×12 inches). The strip samples were tested for Climbing Drum Peel Strength in accordance with Military Standard No. MIL-STD-401A of "Sandwich Constructions and Core Materials: General Test Methods", U.S. Department of Defense, Sept. 26, 1967.

Control samples were prepared in the same manner as the test panels, except that the spunlaced sheet were omitted. The control samples were also tested for peel strength. The results of the measurements were as follows:

| Peel Strength (Force/unit width) | Sample | |
|---|---|---|
| | Control | Test Panel |
| Top Side | | |
| Newtons/cm | 1.9 | 6.7 |
| (lb/in) | (1.1) | (3.8) |
| Bottom Side | | |
| Newtons/cm | 2.9 | 11.6 |
| (lb/in) | (1.7) | (6.6) |

The results show that the panels of the invention were 3½ to 4 times stronger in peel strength than the control panels.

I claim:

1. In a lightweight structural panel having an aramid honeycomb core faced with a resin-impregnated fiber layer, the improvement comprising, for increased peel strength between the core surface and facing layer, a spunlaced fabric composed of at least 50% by weight of aramid fibers, said spunlaced fabric being pervaded by the resin, being located between the facing layer and the core surface and providing a strong bond between the core and the facing.

2. A panel in accordance with claim 1 wherein the aramid fibers of the spunlaced fabric are of poly (m-phenylene isophthalamide) polymer.

3. A panel in accordance with claim 1 wherein the spunlaced fabric has a unit weight in the range of 15 to 30 g/m².

4. A panel in accordance with claim 1, 2 or 3 wherein the panel is a sandwich structure in which the honeycomb core has a second surface bonded to a spunlaced fabric and a facing layer in the same manner as the other surface.

5. A panel in accordance with claims 1, 2 or 3 wherein the resin is a phenolic resin and the facing layer is a resin-impregnated woven fabric of poly(p-phenylene terephthalamide) yarn.

6. A process for preparing an improved lightweight structural panel comprising forming an assembly of an aramid honeycomb core, a spunlaced fabric which includes at least 50% by weight of aramid fibers, and a resin-impregnated fiber facing layer, by interposing the spunlaced fabric between and adjacent to a surface of the honeycomb core and a surface of the facing layer, heating the assembly to cause resin from the facing to prevade the interposed spunlaced fabric and curing the resin to bond the assembly.

7. A process in accordance with claim 6 wherein the aramid fiabers of the spunlaced fabric are of poly(m-phenylene isophthalamide) polymer.

8. A process in accordance with claim 6 or 7 wherein the spunlaced fabric has a unit weight in the range of 15 to 30 g/m².

* * * * *